United States Patent [19]

Kusube et al.

[11] Patent Number: 4,703,788
[45] Date of Patent: Nov. 3, 1987

[54] TIRE TREAD WITH ZIG-ZAG GROOVES WITH PROJECTIONS IN GROOVE

[75] Inventors: Haruo Kusube, Aichi; Kiyoshi Ochiai; Tetsuhiro Fukumoto, both of Fukushima; Akihiro Takeuchi, Hyogo, all of Japan

[73] Assignee: Sumitomo Rubber Industries, Ltd., Japan

[21] Appl. No.: 776,978

[22] Filed: Sep. 17, 1985

[51] Int. Cl.$^4$ ............................................. B60C 11/00
[52] U.S. Cl. ................................................ 152/209 R
[58] Field of Search ...................... 152/209 R, 209 D; D12/142, 143, 145

[56] References Cited

U.S. PATENT DOCUMENTS 3,951,193  4/1976  Yeager ........................... 152/209 R
4,423,760  1/1984  Treves ........................... 152/209 R Primary Examiner—Michael Ball
Attorney, Agent, or Firm—Stevens, Davis, Miller & Mosher

[57] ABSTRACT

A heavy duty pneumatic tire having a tread provided on its outer surface with at least one circumferential groove. On the groove wall multiple projecting blocks are provided at an interval between the adjoining projecting blocks in the circumferential direction corresponding to 10–50% of the circumferential length of the projecting block and between the projecting blocks on the opposite groove walls a narrower groove is formed circumferentially having the open groove width corresponding to 5–50% of the open groove width of the above mentioned wider circumferential groove.

5 Claims, 6 Drawing Figures

TIRE TREAD WITH ZIG-ZAG GROOVES WITH PROJECTIONS IN GROOVE

BACKGROUND OF THE INVENTION

This invention relates to heavy duty pneumatic tires for use in heavy vehicles such as trucks and buses, having tread patterns incorporating anti-skid grooves of a shape to minimize stone pick-up and stone retention without reducing wet-grip performance of tires.

Pneumatic tires are conventionally provided with a tread surface having an anti-skid pattern defined by circumferential grooves or, and transverse grooves which are molded in the surface of the tread during manufacture.

In general, a pneumatic tire has a tread patterns of the lug, rib, rib-lug, block, lug-block or rib-block pattern type which is selected in accordance with performances required for the tire depending on the use of the tire, reasonal factors, road conditions, etc. especially a pattern of tread grooves for heavy duty tires for use in heavy vehicles such as trucks and buses are mainly used with a tread pattern of the rib, rib-lug or rib-block type pattern with respect to the strong requirement for wet grip performance and long wear life tread performance.

However, such a tread pattern having circumferentially extending longitudinal grooves has the following drawbacks when compared with the other tread patterns such as a lug-type pattern.

That is, stone pick-up is apt to occur in the circumferential groove. If this occurs and the tire is driven, it is difficult to discharge stones from the groove due to the strong restraining force of the groove. As a result, the stones strike the bare rubber between the bottom of the circumferential grooves and the reinforcement for the tread portion on the belt for every rotation of the tire and tend to cause the breakage of the bare rubber and hence damage the belt layers or carcass plies inside the tread rubber. Particullarly, when the belt is comprised of metal cords, rust is induced by penetrating water from the damaged portion of the bare rubber into the belt or the carcass plies and as a result, separation failure of metal cords from the rubber is caused. Finally there is the fatal possibility of damaging the durable life of the tire.

As a countermeasure against such stone pick-up, it has hitherto been proposed to arrange a groove with a step (∪-shaped groove) continuously extending toward the circumferential direction of the tire on the groove walls of the longitudinal groove and to arrange a protoruded stripe continuously extending toward the circumferential direction of the tire on the groove bottom. In the former case, the stone pick-up is somewhat protected in the early stage of the tire use by the wider groove and the narrower groove, However when the wider grooves disappeared due to tread wear, only the narrower groove remains, and as a result, there is a problem to reduce the wet grip performance in the worn tire saving only the narrower groove. In the latter case, the bare rubber on the groove bottom is somewhat protected, but it can not practically and satisfactorily be expected to facilitate the discharge of picked up stones.

BRIEF SUMMARY OF INVENTION

It is, therefore, an object of this invention to advantageously solve the aforesaid problem without reducing the wet grip performance in pneumatic tires for heavy vehicles having a rib-type tread pattern irrespective of having a carcass whether of bias or radial construction.

DETAILED DESCRIPTION

In a heavy duty pneumatic tire having a tread provided on its outer surface with at least one circumferential groove, the blocks thereof are intermittently arranged on the both groove walls of the aforementioned circumferential groove from the groove bottom and the surface of the projecting blocks is under the outer surface of the tire, and between the projecting blocks on the opposite groove wall to each other, the circumferential narrower groove is to be arranged to divide both opposite projecting blocks in the axial direction.

The present invention will be explained in more detail referring to the accompanying drawings.

Figure 1:
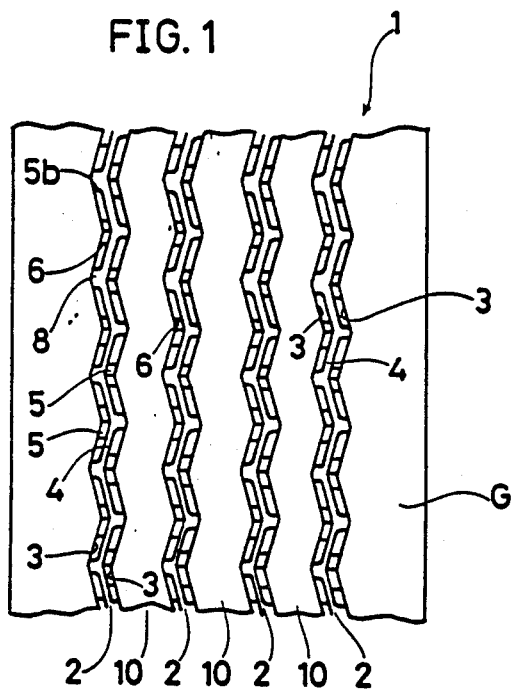
FIG. 1 is a developed plan view of an embodiment of the tread portion in the tire according to this invention.

FIG. 1 is a developed plan view of an embodiment of the tread portion in the tire according to this invention. Referring to FIG. 1, a heavy duty pneumatic tire 1 has at least one circumferentially extending longitudinal grooves 2, and the number of projecting blocks 5 to be defined by the narrower groove 4 are intermittently arranged extending toward the circumferential direction of the tire on the groove walls 3 of the circumferential longitudinal grooves 2. In a preferred embodiment of the pneumatic tire of the present invention a longitudinal groove with a narrower longitudinal groove has a zig-zag groove form and projecting blocks 5 have a number of knife cuts 6 spaced at a preferable pitch.

On the groove wall 3 of the circumferential groove 2 are disposed plural projecting block 5 each extending from the groove base 7 of the longitudinal groove 2 and being defined by a split part 8 arranged at the corners of respective groove wall 3, and the interval $l_2$ between the adjoining projecting blocks 5—5 is approximately 10 to 50% of the circumferential length $l_1$ of each projecting block. The upper surface 5a of the projecting block 5 is at a distance H1 under the tread surface G and having a step 9, where height H1 is arranged to be 0.2 to 0.8 time of the height H of longitudinal groove 2.

Figure 4:
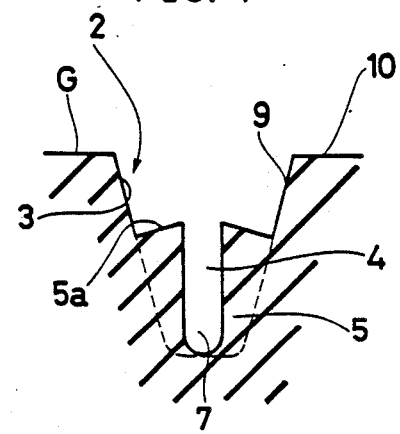
Figure 5:
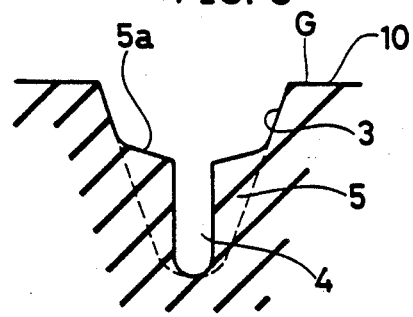

The upper surface 5a of block 5 is generally parallel to the tread surface G when it leans toward the axial direction or the circumferential direction of the tire can be used as another embodiment of the present invention, for example, as shown in FIG. 4, its upper surface 5a leans to be higher toward the narrow groove 4 than at the groove wall 9 or as shown in FIG. 5 its upper surface 5a leans to be lower toward the narrow groove 4 than at the groove wall 9.

The groove width W1 of the aforesaid narrower groove 4 which defines the projecting blocks in the axial direction is preferably to be 5 to 50% of the groove width W of the longitudinal groove 2 to drainage performance. The lowering of wet grip performance by wearing down of the longitudinal wider groove 2 can be prevented by adopting such arrangement as the angle $\alpha_2$ of the zig-zag form of the narrower groove 4 extending in the circumferential direction of the tire should be smaller than the angle $\alpha_1$ of the zig-zag form of the longitudinal groove 2.

The knife cuts 6 arranged to have about 2 mm width on the projecting block 5 extend toward the axial direction of the tire and its depth is the same as the depth of the narrower groove. The knife cuts 6 work to increase the drainage efficiency, when the surface 5a of the projecting block 5 begun to contact the road surface after the longitudinal wider groove 2 disappeared due to wear down.

Figure 3:
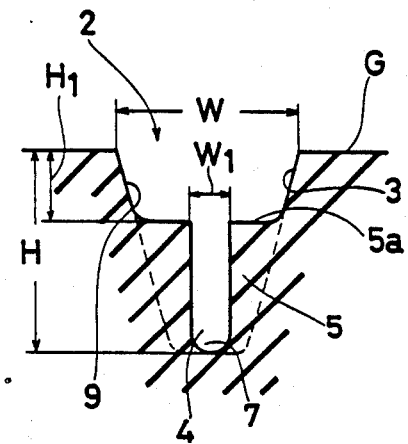
FIGS. 3, 4 and 5 are sectional views taken along the line A—A of FIG. 2; showing modifications of the sectional configuration of the projecting block and FIG. 6 show the results of the tests conducted to compare the conventional rib pattern and the pattern embodying this invention in respect of the relation between the number of picked up stones and the travelling distance.

As aforementioned, when the tread rubber wear down to the extent where the wider groove of the longitudinal groove 2 disappears, the narrower groove 4 appears on the tread surface and the groove width contacting with road suddenly become narrower to W1 from W in the case of FIG. 3.

However, after the longitudinal wider groove 2 disappears, the split parts 8 having a beforesaid spaces $l_2$ which are arranged between projecting blocks 5 assume the function to work as a traverse groove to maintain the wet grip performance. Accordingly, if the beforesaid space $l_2$ is less than 10% of the circumferential length $l_1$, of the block 5 the wet grip performance become to be insufficient, on the other hand, if $l_2$ is more than 50% of the circumferential length $l_1$ of the block 5, there is a tendency toward non-uniform or the uneven wear of the edges 5b of the block 5, after the continuous travel of the tires over a long distance for a long period of time.

According to the present invention, if obstructions scattered on a road surface such as ground stones and the like are picked up by the circumferential grooves, the block 5 prevent picked up stones from reaching to the base rubber between the bottom of the circumferential grooves and the reinforcement or the belt for the tread portion and causing breakage of the bare rubber and damaging the reinforcement or the belt inside the base rubber and the bottom of the circumferential groove has such a step that the discharge of picked up stones is facilitated.

Furthermore the projecting blocks have a function to control the movement of the rib portion 10 at the ground contact area for every rotation of the tires and to prevent the rib edges from suffering from uneven wear.

As stated hereinbefore, the invention effectively and adequately solves the harmful influence of stone pick-up by the tread groove in heavy duty pneumatic tires having a so-called rib-type tread pattern irrespective of whether the carcass is of bias or radial construction without raising other serious defects particularly without lowering the wet grip performance even if the circumferential grooves having a wide open groove width due to wear.

Figure 2:
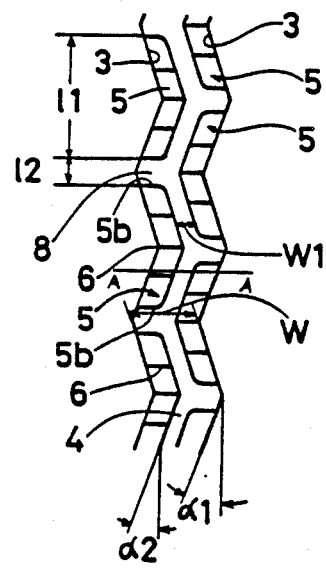
FIG. 2 is an enlarged view of a circumferential groove embodying this invention.

The effectiveness of the present invention was confirmed by the following test with respect to two tires A and B having the same open groove width of the circumferential groove, wherein the tire A is the above illustrated tire having the tread pattern with a circumferential groove with the projecting blocks intermittently disposed on the opposed groove walls thereof as shown in FIG. 1, FIG. 2, FIG. 3 and the tire B is a prior art tire having a U-shaped circumferential groove without the projecting blocks 5 as shown in FIG. 1.

The detailed specifications on test tires are shown in the following table 1.

TABLE 1

| | A | B |
|---|---|---|
| Wider open groove width of the longitudinal groove W (mm) | 13.0 | 13.0 |
| Angle of the zig-zag form of a longitudinal groove $\alpha 1$ (°) | 17.0 | 17.0 |
| Circumferential length of the projecting block $l_1$ (mm) | 25.0 | — |
| Space between the projecting blocks $l_2$ (mm) | 5.0 | — |
| Depth of the longitudinal groove H (mm) | 14.5 | 14.5 |
| Height of the step on the projecting block H1 (mm) | 5.0 | — |
| Narrower groove width between projecting groove W1 (mm) | 3.0 | — |
| Angle of the zig-zag form of the narrower groove $\alpha 2$ (°) | 15.0 | — |
| Degree of damages by stone pick-up on the groove bottom | 0.2 | 2.4 |

Test conditions are as follows,

Radial tires of 10.00 R20, 14PR. having steel cord layers for reinforcing belts and rims of 7.50 V×20 were tested with an inner pressure of 7.25 kg/cm and subjected to a load of 2,700 kg on a tire and traveling speed was about 50 to 70 km/h.

The degree of damages by stone pick-up on the bottom of the circumferential groove and the number of stones picked-up in the circumferential groove of each tire were measured respectively with respect to the traveling distance.

Figure 6:
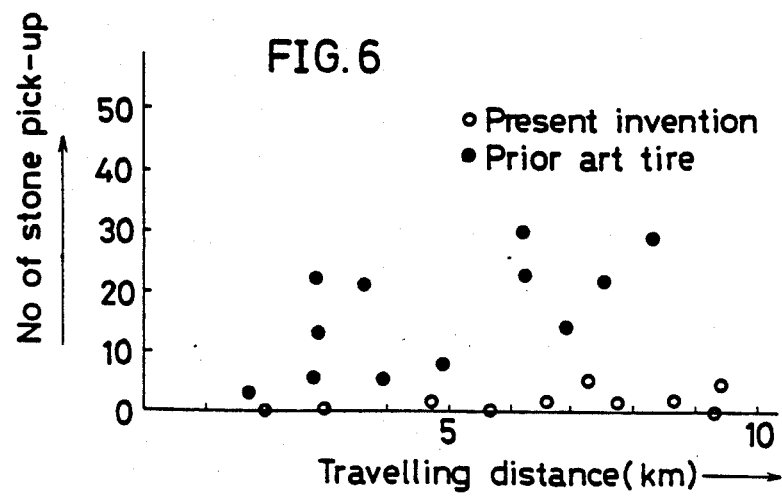

The relation between the traveling distance and the number of picked up stones was shown in FIG. 6, from which it can be recognizned that the tire A according to the present invention hardly produces any stone pick-up, and the degree of damage in the table 1 means the rate of suffering damages on the groove bottom by the stone pick-up and the great improvement of the tire A is shown.

What is claimed is:

1. A heavy duty pneumatic tire for heavy vehicles having a tread comprising:
   at least one circumferential groove provided on the surface of the tread, and extending zigzag in the circumferential direction of the tire to form alternating projecting portions and re-entrant portions on the opposed groove walls thereof;
   a plurality of projecting blocks within said circumferential groove and projecting oppositely from the opposed groove walls under the tread surface to form a narrow groove between the axially adjacent projecting blocks in the circumferential groove, and arranged circumferentially discontinuously to form a space between circumferentially adjoining projecting blocks at the projecting portion of the groove wall; the space between circumferentially adjoining projecting blocks being in a range of 10% to 50% of the circumferential length of the projecting block; and
   at least one cut in the projecting block, and extending radially to the circumferential groove.

2. The tire of claim 1 wherein the open tip width of the narrow groove is in the range of 5% to 50% of the open top width of the circumferential groove.

3. The tire of claim 1 wherein the narrow groove is of zigzag form whose angle to the circumferential direction of the tire is smaller than the angle of the zigzag of the circumferential groove to the circumferential direction of the tire.

4. The tire of claim 1 wherein the width of the cut is under 2 mm.

5. The tire of claim 1 wherein the depth of the cut is almost the same as the depth of the narrow groove.

* * * * *